Patented July 22, 1924.

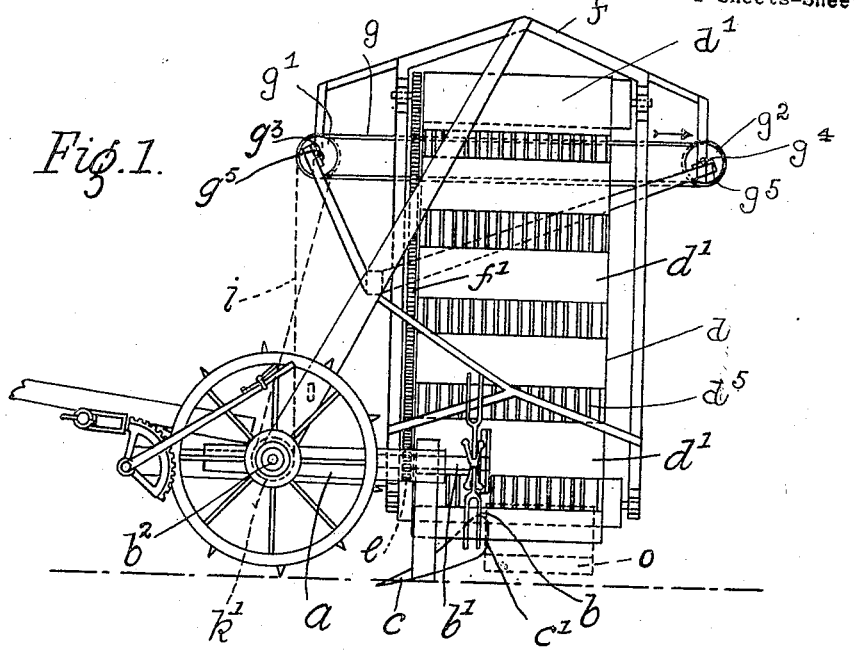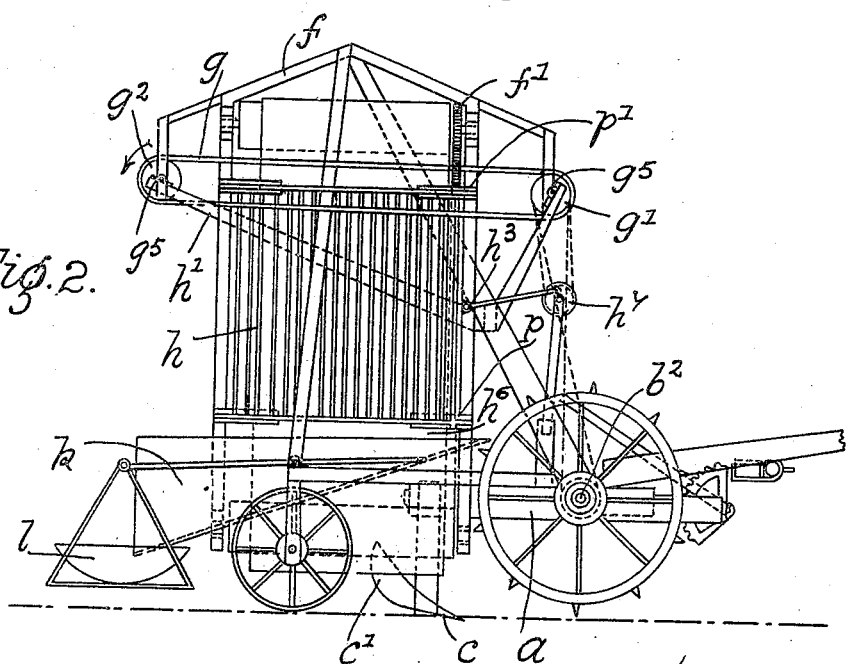

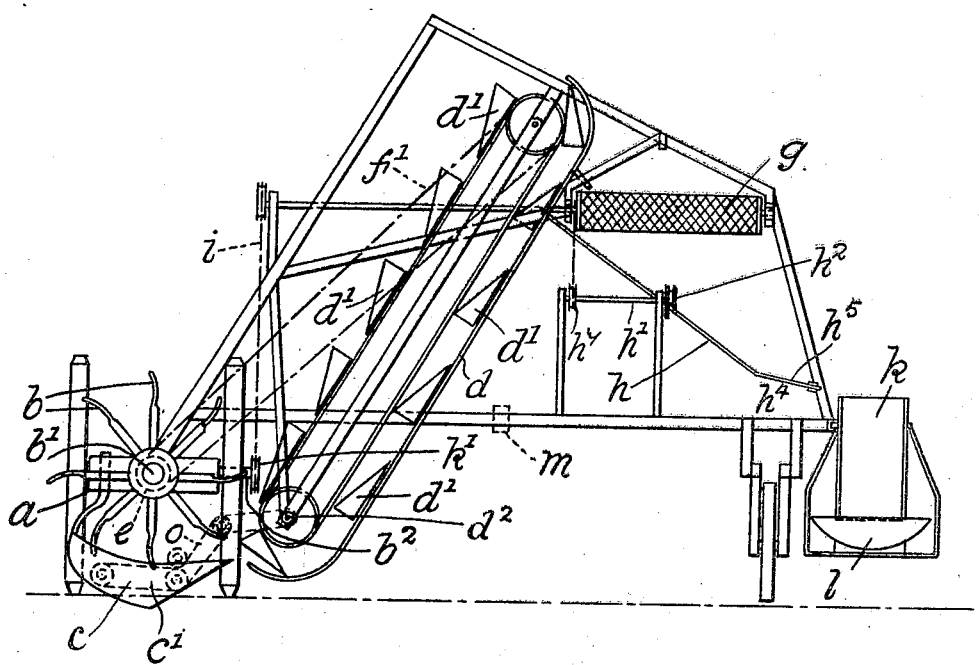

1,502,570

UNITED STATES PATENT OFFICE.

WILLIAM JOHNSTON, OF BALLYKILBEG, IRELAND.

POTATO DIGGER.

Application filed July 1, 1918. Serial No. 242,722.

*To all whom it may concern:*

Be it known that WILLIAM JOHNSTON, farmer, of Ballykilbeg, county of Down, Ireland, has invented certain new and useful Improvements in and Relating to Potato Diggers, of which the following is a specification.

This invention relates to potato diggers of the class in which a fixed share is used, working in conjunction with revolving forks or beaters, and it particularly relates to the means for raising the potatoes clear of the digger, freeing them from the soil and haulms, and depositing them in suitable receptacles.

Under this invention, the axle, carrying the revolving forks or beaters, and the share are so arranged that the drill of potatoes is raised bodily, and thrown into a revolving elevator, operated from the driving gear of the digger and consisting of an endless chain of openwork buckets or receptacles, constituted by a series of rods or their equivalent, whereby a portion of the soil can be discharged.

The elevator buckets raise the potatoes, haulms, and soil, and discharge same on to a flexible wide mesh endless riddle, revolving on rollers or their equivalent, which riddle separates the haulms from the potatoes and soil, and deposits the haulms on the ground, in a direction opposite to that in which the digger is moving, thereby allowing the potatoes and any remaining soil to be discharged on to a rodded screen, or its equivalent, arranged so as to slope slightly downwards towards the surface of the ground. The remaining soil passes through the screen whose lower end is arranged, and, preferably, formed at a slightly different angle from the remainder, so that, when the potatoes, by virtue of their shape, roll downwards and reach the lower end, they bound forward slightly and are deposited in a trough arranged for their reception, stones and small clods which have not passed through the interstices of the screen, slide downwards towards the lower end of same and, on account of their slower movement, they, when they reach the lower end, simply drop on to the ground between the trough and the end of the screen.

The trough is preferably made with vertical sides and ends and has a sloping bottom so arranged that the potatoes are directed downwards, into baskets or other receptacles, arranged below, whilst it is suitably mounted on a framework having a wheel, or wheels, whereby it can move forward simultaneously with the digger.

The rodded screen is, preferably, caused to vibrate in a direction parallel to the direction of movement of the digger and such vibratory movement may be given through the medium of a connecting rod, a crank, or other convenient means, from the gearing which operates the riddle; or in any other convenient manner.

The rodded screen may be so constructed that the distance between the rods may be varied or adjusted and it may also be so arranged that the angle it makes to the ground can be varied adjustable supporting means being provided in connection with the screen and the digger for this purpose.

If desired, the trough which receives the potatoes from the screen may be provided with riddles for the purpose of sizing the potatoes and thereby grading them as they pass onwards from the trough to the baskets or other receptacles.

In some cases it may be difficult to so arrange the fixed share and the revolving forks or beaters that they raise the drill sufficiently to allow of it directly entering the buckets of the elevator, which buckets must, of necessity, be some distance above the ground at their lower ends. In this event a second elevator may be provided, preferably consisting of a flexible material, such as canvas, or the like, having metal strips or studs and revolving on rollers so that the drill, or any portion of the drill which fails to reach the buckets will fall on the second elevator and, by its means, be carried to the first elevator and disposed of as previously described.

In order that the invention may be clearly understood I have hereunto appended an explanatory sheet of drawings, whereon—

Fig. 1 is a side view looking from the left hand side of the machine.

Fig. 2 is a side view looking from the right hand side of the machine.

Fig. 3 is a rear view of the machine showing the positions of the elevators and the sloping rodded screen.

Referring to the drawings:—

$a$ is a potato digger of known pattern with forks or beaters $b$ rotatable about an elongated axle $b^1$ in order to correspond, in position, with the rear end $c^1$ of a share $c$ which is longer than the usual pattern and is adapted to raise the drill of potatoes to a point about a foot above the ground. The beaters $b$ project the drill (including the stalks, mould and stones) into the buckets $d^1$ of an elevator $d$ supported from the body of the machine by part of the framework $f$ and operated by an endless chain $f^1$ driven by a cog wheel $e$ on the beater axle $b^1$ between the beaters $b$ and the body of the machine. The buckets $d^1$ may be made of openwork to assist in discharging the soil before reaching the riddle $g$. The potatoes, stalks, mould and stones comprising the drill are raised in the buckets $d^1$ to a height sufficient to allow the contents of the buckets to be discharged at the top of the elevator on to an endless travelling wide-mesh riddle $g$ which allows the potatoes, stones and dirt to pass through and to fall on to a sloping rodded screen $h$ whilst the stalks and rough weeds are carried backwards on the riddle and discharged to the ground at the rear of the machine. The travelling riddle $g$ is supported on drums $g^1$ and $g^2$, on spindles $g^3$ and $g^4$, carried in bearings $g^5$ on the framework of the machine. The spindle $g^3$ and drum $g^1$ thereon are rotated for the operation of the travelling riddle $g$ by a chain drive $i$ driven from a chain wheel $k^1$ on the axle $b^2$. The rodded screen $h$ is so supported that it is capable of a lateral movement effected by a rod $h^1$ connected, at one end $h^2$ (see Fig. 2) with the screen $h$ and, at its other end, $h^3$, pivotally connected with the end of a crank or disc $h^7$ driven from the drum $g^1$ so that the rotation of the latter gives the end $h^3$ of the rod $h^1$ a rotary movement whereby the end $h^2$ is reciprocated and causes the required lateral movements of the screen $h$, which screen is supported in guides $p$ and $p^1$ permitting such movement. The bottom guides $p$ are preferably adjustable in height to adjust the angle of the screen $h$ and the trough $k$ may be capable of a corresponding adjustment.

The fine mould and dirt pass through the screen $h$ and the potatoes, by reason of their shape and weight, acquire a greater velocity as they slide down the screen $h$ than stones mixed with them. The screen end $h^4$ is made with a portion $h^5$ having a lesser angle or slope than the main portion of the screen itself, with a space between its extreme end $h^6$ and the side of the sloping trough $k$ so that the potatoes, by reason of their greater velocity, are caused, by the change or slope of the screen, to jump into the trough over the intervening space, between the screen and the trough, whilst the stones fall between the screen and the trough.

The side of the trough $k$ at the portion opposite the end of the screen $h$ is horizontal and on a level with the end of the screen $h$ or slightly below same. The trough $k$ directs the potatoes into bags, or into a removable receptacle $l$.

The portion $h^5$ of the screen $h$ may be of spring or equivalent nature to assist the potatoes to jump over to the trough $k$.

The machine may be driven by motor power or it may be drawn by two horses yoked in the ordinary way or a third horse may be yoked to a single tree attached to the framework at $m$. (See Fig. 3.)

In addition to the bucket elevators $d^1$ I may provide a small endless elevator $o$ (as shown in dotted lines at Fig. 3) driven from the spindle $d^2$ and adapted to lift into the buckets $d^1$ potatoes which might otherwise fail to reach same from the beaters $b$. The spaces between the buckets $d^1$ of the elevator $d$ may be rodded as shown at $d^5$ (Fig. 1) so that whilst catching the drill as it is thrown from the beaters $b$, some of the mould may pass through the rodded portions $d^5$.

The gradient of the rodded screen $h$ may be adjustable and if necessary provision may be made for it to remain at a given gradient irrespective of the rise or fall of the ground over which the machine travels. This may be done by supporting the screen on pivots, and providing suitable counterbalancing means.

The trough $k$ may be fitted with riddles to size the potatoes and deliver them into different receptacles according to size.

Having now fully described my invention, what I claim and desire to secure by Letters Patent is:—

In a potato digger, a flexible, endless riddle to receive and separate the potatoes, haulms and soil discharged thereupon, means for actuating said riddle, an inclined screen for receiving the potatoes from said riddle, and having its lower discharge terminal at an angle in the same direction as the main portion and of a resilient nature in order to cause the potatoes to jump beyond the end of the angular position, and means to agitate said screen laterally.

In testimony whereof he affixes his signature in presence of two witnesses.

WILLIAM JOHNSTON.

Witnesses:
GEORGE ALLEN,
ANDREW HAMILTON.